United States Patent [19]

Fernandez et al.

[11] Patent Number: 5,541,492
[45] Date of Patent: Jul. 30, 1996

[54] METHOD FOR CHARGING A MULTIPLE VOLTAGE ELECTROCHEMICAL CELL

[75] Inventors: Jose M. Fernandez, Plantation; Vernon Meadows, Coral Springs; Anaba A. Anani, Lauderhill, all of Fla.

[73] Assignee: Motorola, Inc., Schaumburg, Ill.

[21] Appl. No.: 432,663

[22] Filed: May 2, 1995

Related U.S. Application Data

[63] Continuation of Ser. No. 185,338, Jan. 24, 1994, abandoned.

[51] Int. Cl.$^6$ ............................................... H01M 10/44
[52] U.S. Cl. ............................................. 320/22; 320/39
[58] Field of Search ............................. 320/20, 21, 22, 320/23, 24, 31, 32, 39, 48, 3 J

[56] References Cited

U.S. PATENT DOCUMENTS

| | | | |
|---|---|---|---|
| 4,388,582 | 6/1983 | Saar et al. | |
| 4,396,880 | 8/1983 | Windebank | 320/21 |
| 4,503,378 | 3/1985 | Jones et al. | 320/20 |
| 4,639,655 | 1/1987 | Westhaver et al. | |
| 4,670,703 | 6/1987 | Williams | 320/22 |
| 4,742,290 | 5/1988 | Sutphin et al. | 320/21 |
| 4,746,852 | 5/1988 | Martin | 320/20 |
| 4,767,977 | 8/1988 | Fasen et al. | 320/20 |

*Primary Examiner*—Peter S. Wong
*Assistant Examiner*—Edward Tso
*Attorney, Agent, or Firm*—Kenneth M. Massaroni; Scott M. Garrett

[57] ABSTRACT

A method (200) of charging a multiple voltage battery is disclosed. The multiple voltage battery is characterized by a preselected operating voltage and a charge profile curve having at least two occurrences of the slope thereof being substantially zero. The number of occurrences of the slope of the charge profile curve being substantially zero corresponds to the number of voltage levels the cell is adapted to operate in. The method recognizes the signature charging profile of the multiple voltage level battery and is thus capable of terminating battery charge at the level corresponding to the preselected operating voltage.

6 Claims, 6 Drawing Sheets

METHOD FOR CHARGING A MULTIPLE VOLTAGE ELECTROCHEMICAL CELL

CROSS REFERENCE TO RELATED APPLICATIONS

This is a File Wrapper continuation of U.S. Ser. No. 08/185,338 filed on Jan. 24, 1994 and assigned to Motorola, Inc., now abandoned.

This application is related to U.S. application Ser. No. 08/100,812, filed Aug. 2, 1993, entitled "MULTIPLE VOLTAGE BATTERY CELL", by Francis P. Malaspina and Anaba Anani, and assigned to Motorola, Inc.

TECHNICAL FIELD

This invention relates in general to charging regimes for secondary battery cells, and particularly to charging regimes for cells capable of multiple voltage operation.

BACKGROUND

Conventional electrochemical cells are designed and manufactured to use ampere-hour electrode capacities within a specified extent of reaction. This restriction is necessary in order to hold the cell at a specified nominal voltage. Conversely, cell voltage may be regulated within a given range so as to maintain the needed extent of reaction. For example, nickel-cadmium (Ni-Cd), nickel-metal hydride (Ni-MH), nickel-hydrogen (Ni-$H_2$), and lead acid chemistries have average nominal cell voltages of 1.2V, 1.23V, 1.23V, and 2.1V, respectively.

Apparatus and methods for charging these types of batteries typically rely upon a single change in the slope of the battery voltage charging curve in order to determine when charging should be terminated. For example, U.S. Pat. No. 4,639,655 to Westhaver, et. al., for "METHOD AND APPARATUS FOR BATTERY CHARGING" discusses a charging regime which looks for a "knee region" in the battery charging curve to determine the stop point in the charging regime. The "knee region" is that part of the charging curve where the slope of the curve (i.e., the rate of change of cell voltage versus time) either begins to decrease, or in fact becomes negative.

Similarly, U.S. Pat. No. 4,388,582 to Saar, et. al. for "APPARATUS AND METHOD FOR CHARGING BATTERIES" discusses monitoring a battery characteristic, such as battery voltage, to identify "inflection points" in the charging curve. These inflections points are related to changes in the slope of the charging curve, and indicate at what stage, and when the charge should be terminated. The charge is typically terminated when the slope of the curve either decreases, or becomes negative.

These battery charging regimes will not however, work with the multiple voltage battery cell disclosed and claimed in the referenced '812 application. Since the '812 cell is multiple voltage, (i.e., operates at two or more distinct operational voltage regimes) the cell is characterized by a charging curve wherein the slope of the charging voltage versus time, (for example) decreases at least twice. Using the methods described in the above-referenced patents, the multiple voltage cell described in the '812 application would be only partially charged at best.

Accordingly, there exists a need to provide a cell charging apparatus, and charging regime capable of fully charging multiple voltage electrochemical cells capable of operating at multiple voltage levels.

SUMMARY OF THE INVENTION

Briefly, according to the invention, there is provided a method of charging an electrochemical cell capable of multiple voltage operation. The method includes the steps of providing a rechargeable cell adapted to operate in more than one voltage regime, i.e. at multiple voltage levels. After placing the multiple voltage electrochemical cell into a charging apparatus, a charging current is supplied to the cell. While current is being applied, at least one physical characteristic of the cell is measured and plotted as a function of time. The plotted characteristic versus time yields a characteristic profile curve.

The physical characteristic measured and plotted may be, for example, cell voltage, cell pressure, cell temperature, cell current or combinations thereof. As time progresses while charging, each of the aforementioned characteristics typically reach a first plateau, increase for a period, ultimately reaching a final plateau and decreasing. By taking advantage of this phenomena, it is possible to determine the cell's charge termination point by selecting a termination point to be consistent with at least the second occurrence of the slope of the generated profile curve being zero. The number of occurrences of the profile curve being substantially zero would correspond to the number of voltage regimes which the electrochemical cell is capable of being operated at.

Also disclosed is a charging apparatus for recharging an electrochemical cell capable of multiple voltage operation. The charging apparatus includes a power supply means capable of charging the cell to different voltage levels, a controller coupled electrically to the power supply means and the electrochemical cell. The controller is adapted to measure at least one physical characteristic of said cell via a plurality of sensing lines.

Operatively disposed in the controller, as by being burned in or embedded in the controller, is a charging algorithm adapted to measure a physical characteristic of the electrochemical cell, and provide a profile curve which is a function of said characteristic versus time. By employing this curve, the charging apparatus is able to determine a charge termination point by terminating said charging upon the second or subsequent occurrence of the slope of the profile curve being zero.

DETAILED DESCRIPTION OF THE PREFERRED EMBODIMENT

Figure 1:
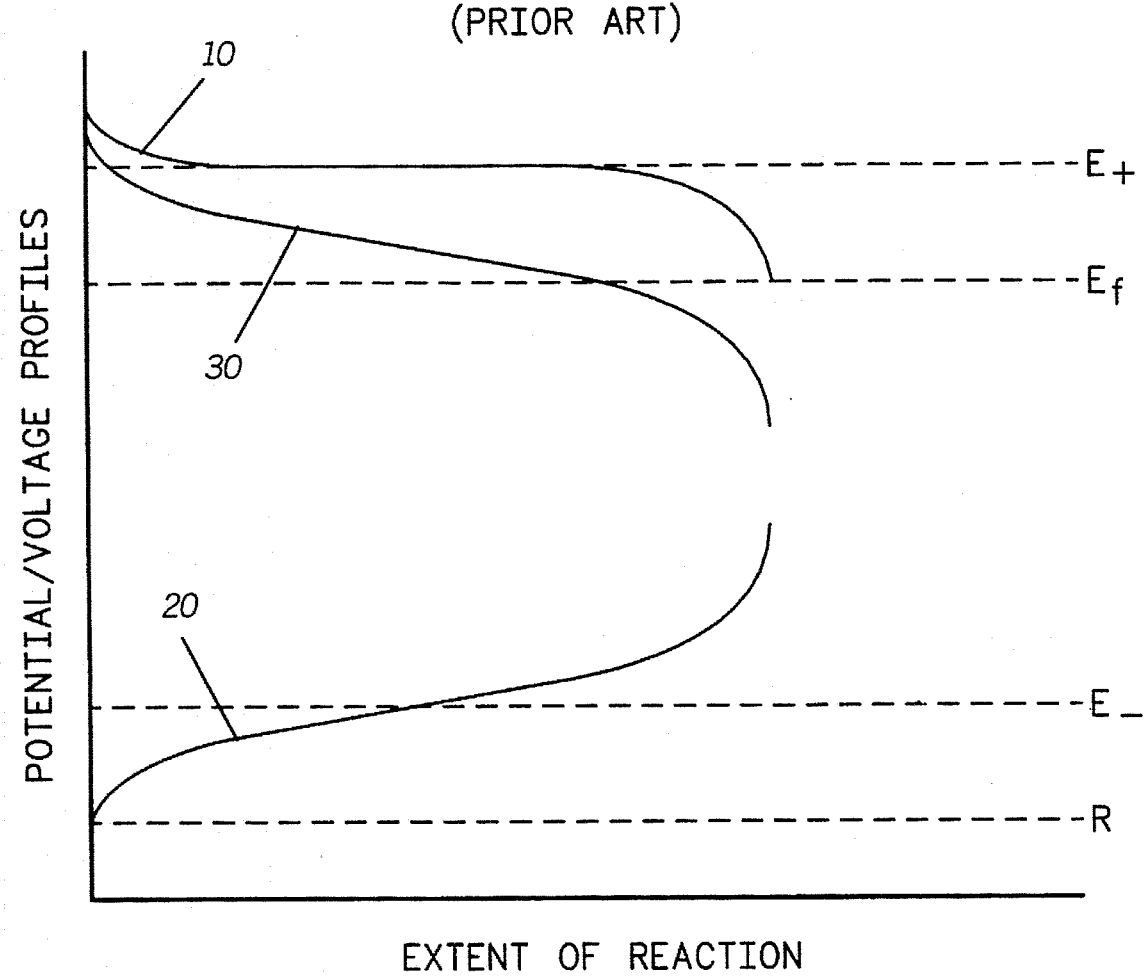
FIG. 1 is a graph of potential versus extent of reaction of a prior art electrochemical cell.

While the specification concludes with claims defining the features of the invention that are regarded as novel, it is believed that the invention will be better understood from a consideration of the following description in conjunction with the drawing figures, in which like reference numerals are carried forward.

A conventional battery cell comprises a positive electrode, a negative electrode and an electrolyte. The electrodes must be separated from each other to prevent direct electronic contact. The difference in their individual electrode potentials determine the nominal voltage of the cell. In these cells, voltages are regulated within a certain range so as to maintain the needed capacity. This is illustrated in FIG. 1 for the general case of a nominal cell voltage, $E_f$. The dashed line $E_+$ represents the average or nominal potential of the positive electrode while the line $E_-$ is the average potential of the negative electrode. Dashed line R is the reference potential. The cell voltage profile is the difference of the electrode potential profiles at each point of the extent of reaction, yielding a nominal cell voltage represented by the line $E_f$. During a normal discharge cycle, the individual electrodes are discharged according to the positive and negative electrode potential profiles 10 and 20 shown. The output of the cell, monitored externally via the positive and negative terminals, follows the cell voltage profile 30 as indicated. The average of this voltage profile is the nominal cell voltage reported for the cell.

Figure 2:
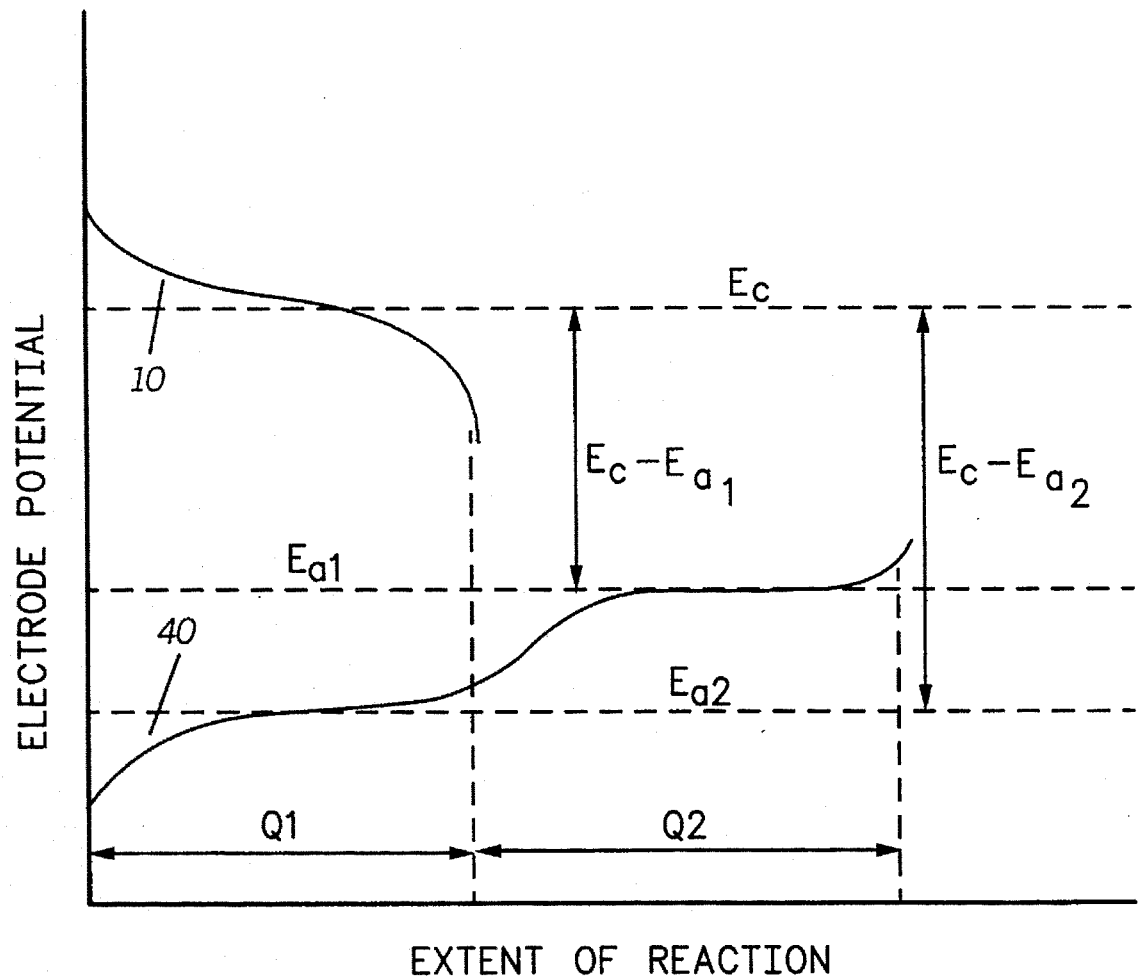
FIG. 2 is a graph of electrode potential versus extent of reaction in a multiple voltage electrochemical cell.

The battery cell described and claimed in the related patent application is constructed in a "multiple function" configuration in which the cell voltage is tailored according to the different applications, and is capable of operating at several nominal voltage regimes. FIG. 2 is an illustration of electrode potential profiles for active materials that could be used as electrode couples for cell voltage tailoring. Zones Q1 and Q2 are extents of reactions (or capacities) corresponding to the different regions of operation. Dashed line $E_c$ is the nominal potential of one electrode of the electrode couple, represented here as the positive electrode or cathode. Dashed lines $E_{a1}$ and $E_{a2}$ are nominal potentials of the tailoring or control electrode with two separable extents of reaction. When used as electrode couples in a cell, operating cell voltages $E_c-E_{a1}$ or $E_c-E_{a2}$ can be attained independently via appropriate cell assembly and re-charging.

In this illustration, it is assumed that the cathode is cell capacity limiting, and the voltage of the cell is determined by the state of charge of the anode. In practice, this role can be reversed, while the principle of operation remains the same. When the potential of the cathode is fixed at an average nominal value $E_c$, and the state of charge of the anode is controlled to the potential $E_{a1}$, the cell voltage will be fixed at $E_c-E_{a1}$. Similarly, when the state of charge is controlled to $E_{a2}$, the cell voltage will be $E_c-E_{a2}$. Hence by monitoring the state of charge of the control electrode, the cell voltage can be tailored for different applications with different voltage requirements. Operation in two different voltage regimes is illustrated by line 40 of FIG. 2 wherein the first voltage regime corresponds to extent of reaction Q1, and the second corresponds to extensive reaction Q2.

There are several arrangements that can be employed to achieve the necessary pre-charged configuration of the cell. The first involves assembling the cell with active electrode materials that have been pre-charged to a desired voltage level or extent of reaction. This allows the cell to be assembled so that it is either cathode or anode capacity limiting. This is akin to a traditional electrochemical cell arrangement, with the subtle but significant difference that one electrode is tailored to operate at a selected voltage level, the level being chosen from two or more possible voltage regimes. Operation in a different voltage regime, for use in a different application with a different voltage range, would require the cell to be pre-charged to a different state prior to assembly.

In another preferred embodiment, the cell is pre-charged to the voltage of the desired application. When the cell is constructed such that the cell capacity is limited by the capacity of the tailored electrode, then the fixed-voltage electrode is manufactured to contain enough active material to accommodate the total amount of electroactive species in the entire regions of activity. Charging and discharging for this configuration is achieved via a simple voltage indicator that specifies the operational voltage range, thus making switching between voltage regimes relatively simple.

Figure 3:
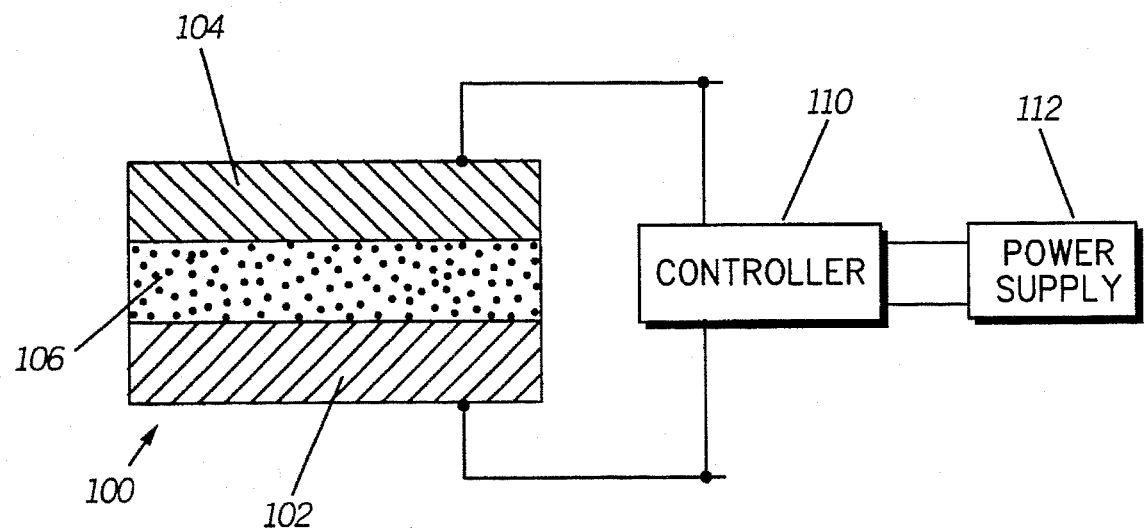
FIG. 3 is a schematic diagram of a battery cell configuration for a multiple voltage electrochemical cell.

Referring now to FIG. 3, the control electrode 102 may be either the positive or negative couple of the cell 100. The fixed-potential electrode 104 serves as the other electrode of the couple, without any difference in the cell's operation and performance. An electrolyte 106 provides the ionic/electrical coupling of the two electrodes 102 and 104. A controller 110 monitors the battery cell voltage and other necessary parameters as well as providing charging control capabilities as required. A power supply 112 delivers the power needed to charge the battery cell 100. The relationship between the cell 100, controller 110, and the power supply 112, as well as a charging regime are discussed in greater detail with respect to FIGS. 5–7.

Figure 4:
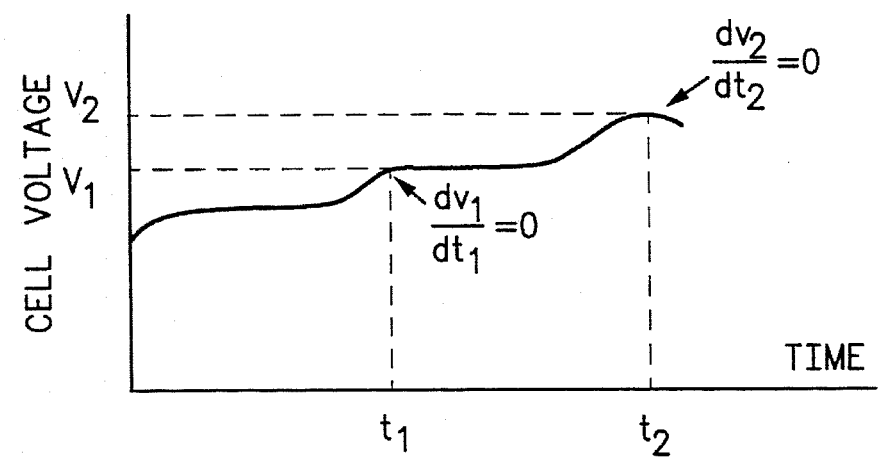
FIG. 4 is a graph illustrating cell voltage versus time during charging of a multiple voltage electrochemical cell.

Referring now to FIG. 4, there is illustrated therein an electrochemical cell charge profile of, for example cell voltage, during charging, wherein changes in cell voltage are plotted as a function of time. As may be appreciated from a perusal of FIG. 4, the slope of the charging curve may approach zero (0), or become zero (0), or even become negative at least twice; once at the point defined by time $t_1$ and voltage $V_1$ and once at the point defined by time $t_2$ and voltage $V_2$. The number of such slope changes is largely dependent upon the number of voltage regimes in which the cell is adapted to operate. As noted hereinabove, conventional battery chargers relying upon change in slope of the charging profile will terminate the charging regime at the point $V_1$-$t_1$, producing a partially charged battery. While illustrated using the example of voltage, it is to be understood that the charging profile may be calculated by slope, absolute value, area, differentiation, polarization voltage and others. Moreover, the profiles may be monitored by voltage, temperature, current, internal cell pressure, impedance, or other battery characteristics.

Figure 5:
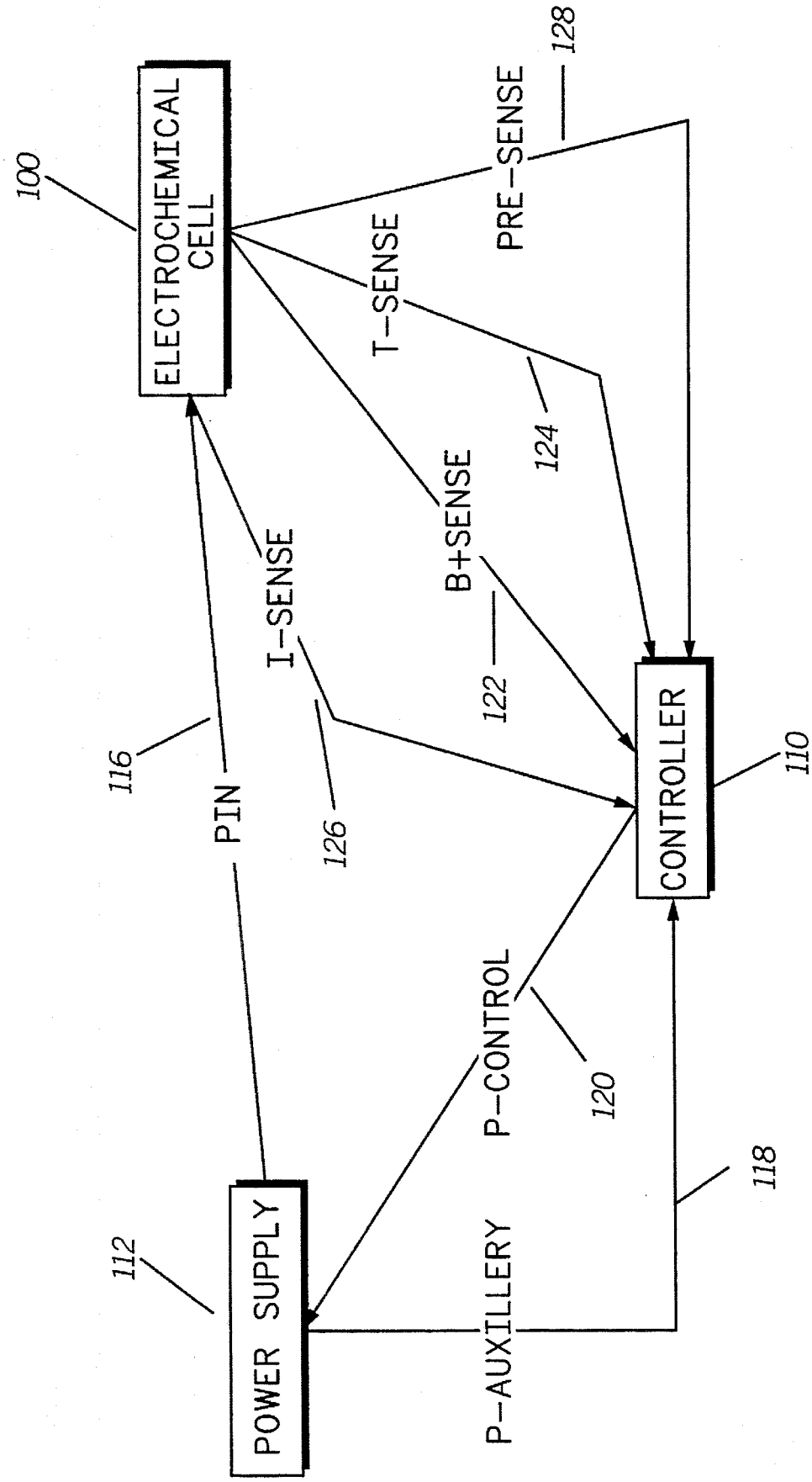
FIG. 5 is a data structure flow chart illustrating the elements of a battery charging apparatus in accordance with the invention.

Referring now to FIG. 5, there is illustrated therein a data structure flow chart showing the relationship of the cell 100, controller 110, and power supply 112 in a battery charging apparatus in accordance with the instant invention. The charging routine, described in greater detail in FIG. 6, may be embedded in or burned into the controller 110. The charging apparatus will be able to monitor the necessary parameters in order to charge one or more electrochemical cells disposed therein. The power supply 112 delivers charge to cell 100 via power-in-line 116, which is in turn controlled by the controller 110, via line 120. The power source 112 also provides power to the controller 110 via auxiliary power line 118. This power will maintain controller 110 operation in order for it to monitor the electrochemical cell 100 during the charging thereof and regulate power flow from the power supply 112, via control line 120. The controller 110 may be a conventional microprocessor including a conventional memory.

The controller 110 monitors the cell 100 via a plurality of monitor lines electrically coupled to a cell 100 disposed in the charging apparatus. These lines include a B+sense line 122, T-sense line 124, I-sense line 126 and pre-sense line 128. The B+sense line 122 is connected to the controller, and monitors cell voltage. The T- sense line 124 monitors cell temperature, and the I sense line 126 monitors the charge current sent from the power source 112 to the cell 100. The pre-sense line 128 indicates the state of charge required by a particular cell. For example, the pre-sense line 128 will indicate whether or not to charge a cell to voltage $V_1$ or $V_2$ (of FIG. 4).

Figure 6:
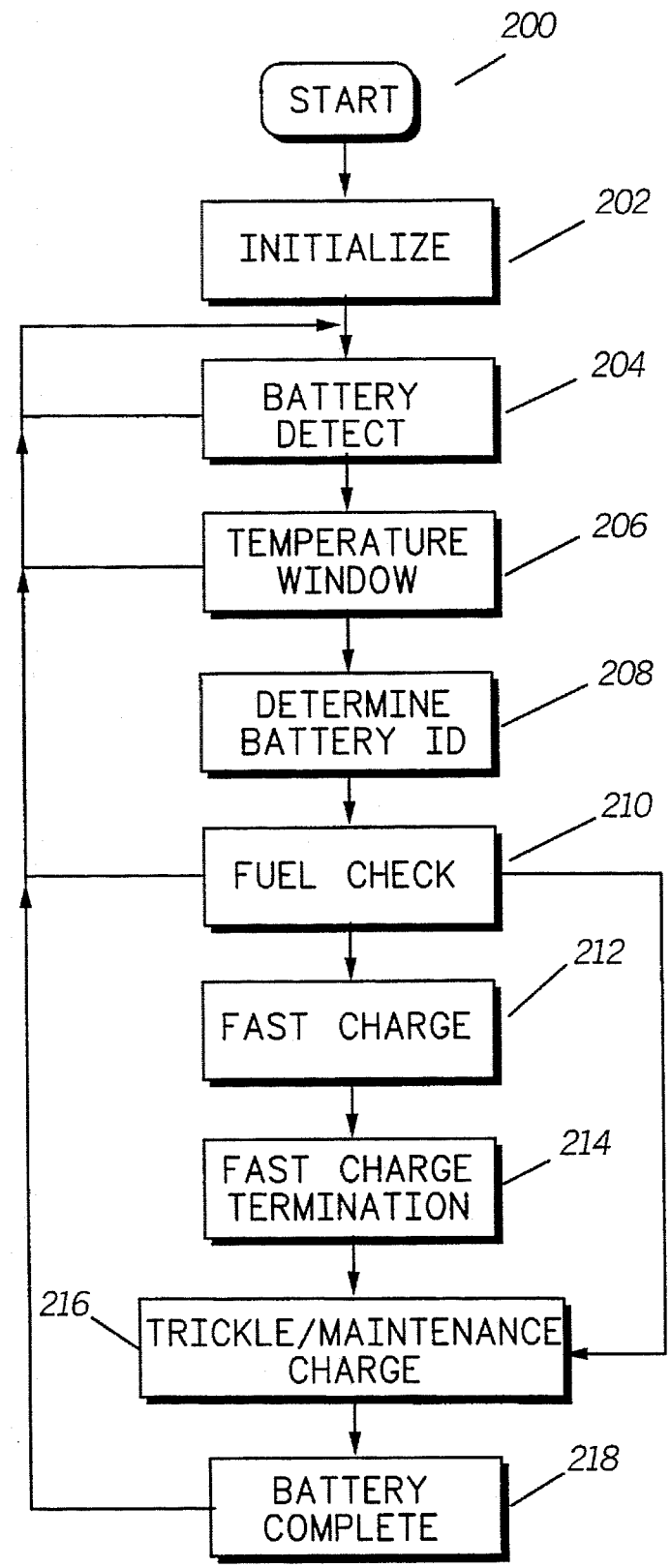
FIG. 6 is a flow chart illustrating a method for charging a multiple voltage cell in accordance with the invention.

Referring now to FIG. 6, there is illustrated therein a flow chart describing the steps of a charging regime in accordance with the instant invention. The controller 110 of FIG. 5 is first initialized as indicated in step 202. This initialization step insures that all logic and electronic states in the controller are in order to begin monitoring the electrochemical cell. Initialization typically occurs when the power supply is first electrically coupled to the controller 110 (i.e., when the controller is turned on) and may reoccur every time the power source is reconnected.

After initialization, a battery detection module 204 is activated to determine whether or not an electrochemical cell is present in the charging apparatus. Assuming the presence of an electrochemical cell, the charging algorithm determines the temperature of the cell, as indicated in step 206. The controller, via T-sense line 124, (of FIG. 5) will check to assure that the temperature of the cell is within a pre-selected temperature window. If the cell is, a fast charging regime will be started, as described below. If the temperature is outside the preselected temperature window, the charging apparatus will indicate to the user that such is the case, and not initiate the charging routine. The temperature window may be, for example, between 10 and 40 degrees Celsius for NiCd and Ni-MH cells.

If the temperature of the cell is within the pre-selected temperature window as specified in step 206, then the controller 110 will initiate the battery identification module 208. This module will determine cell specific information, such as the voltage necessary to charge the cell to one or more of the multiple voltages of the cell (i.e., V1 or V2 of FIG. 4). This cell information is transmitted to the controller 110 via pre-sense line 128.

Having sampled the temperature and battery identification information, the controller 110 will access a fuel gauge module 210 which will determine the total capacity of the cell, and the capacity-to-full of the cell. Fuel gauge module 210 may thus provide for very accurate charging to the specified capacity of the cell.

After determining the capacity of the cell, a fast charge module 212 sends a control signal to the power supply 112 initiating charging of the cell. The fast charge termination module 214 (discussed in greater detail with respect to FIG. 7) periodically checks the cell for the appropriate termination level. Once the termination level is reached, the trickle/ maintenance charge module 216 will begin a relatively slow charge of the cell by altering the control signal provided along control line 120. This will maintain the electrochemical cell in the fully charged state while in the charging apparatus. If the cell is left in the charging apparatus for longer than a pre-selected maximum time, the battery complete module 218 will shut down the charging apparatus altogether in order to prevent overcharging the cell. This module will also periodically monitor the cell to determine whether or not additional charging is required.

Figure 7:
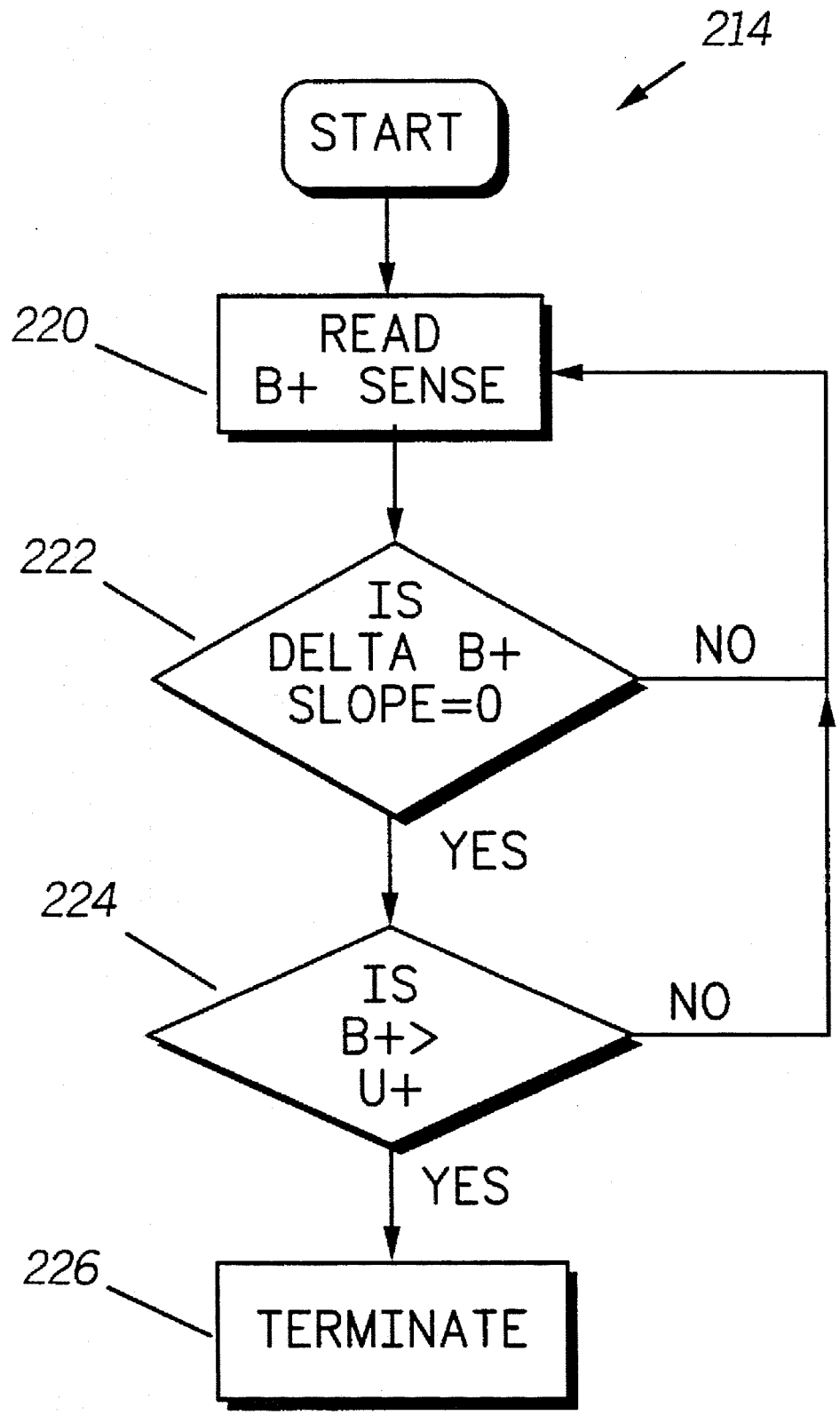
FIG. 7 is a flow chart illustrating the fast charge termination module for a multiple voltage cell in accordance with the invention.

Referring now to FIG. 7, there is illustrated therein the steps of the fast charge termination module 214 of FIG. 6. Fast charge termination module 214 consists of several individual sub-modules. The first such module is the "Read B+ sense" module 220, which monitors the cell voltage. Information collected in module 220 is analyzed by the "ΔB+ slope decision module" 222. If the slope of the voltage approaches 0, the routine proceeds to step 224. If the slope is not approximately 0, then charge continues to be applied to the cell.

Assuming the slope to be approximately or equal to 0, the routine proceeds to step 224, and determines whether or not the battery identification voltage is greater than the active cell voltage. If the cell voltage is greater than the battery identification voltage (for example, V1 or V2 of FIG. 5), then the charge is terminated as illustrated in step 226. If not, charging continues until the condition is met. Thus, the charging apparatus may be adjusted to terminate the charging regime upon the detection of either one, or more occurrences of a zero (0) slope of the charging curve.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging an electrochemical cell capable of multiple voltage operation, said method comprising the steps of:

providing a rechargeable cell adapted to operate at multiple voltage levels, said multiple voltage level cell characterized by a preselected operating voltage, and a charge profile curve having at least two occurrences of the slope thereof being substantially zero;

applying a charging current to said electrochemical cell;

measuring at least one physical characteristic of said cell while applying said charging current, and plotting said measurements as a function of time to generate said characteristic profile curve; and terminating said charging current upon at least the second occurrence of the slope of the charge profile curve being zero.

2. A method as in claim 1, including the further step of applying said charging current as a rapid charging current.

3. A method as in claim 2, including the further step of providing a maintenance charging current to said cell after terminating said rapid charging current.

4. A method as in claim 1, wherein the step of measuring at least one physical characteristic includes the further step of selecting said physical characteristic from the group of characteristics consisting of cell voltage, cell pressure, cell temperature, current and combinations thereof.

5. A method as in claim 1, including the further step of determining the operating voltage of said cell prior to applying said charging current.

6. A method as in claim 5, including the further step of continuing to apply said charging current until said cell is charged to said operating voltage.

* * * * *